(12) United States Patent
Cook et al.

(10) Patent No.: US 6,354,677 B1
(45) Date of Patent: Mar. 12, 2002

(54) BEARING FOR SNOWMOBILE TRACK (75) Inventors: James S. Cook, Plymouth; Chad M. Olson, Isanti, both of MN (US)

(73) Assignee: Industrial Fluid Technologies, Inc., Golden Valley, MN (US)

( * ) Notice: Subject to any disclaimer, the term of this patent is extended or adjusted under 35 U.S.C. 154(b) by 0 days.

(21) Appl. No.: 09/037,406

(22) Filed: Mar. 10, 1998

Related U.S. Application Data (63) Continuation-in-part of application No. 08/710,179, filed on Sep. 13, 1996, now Pat. No. 5,755,495.

(51) Int. Cl.⁷ ............................................. B62D 55/18
(52) U.S. Cl. ..................... 305/122; 305/181; 305/168
(58) Field of Search .................................. 305/163, 164, 305/168, 181, 52, 193, 194, 195, 202, 121, 122, 123, 59, 100–106, 117

(56) References Cited

U.S. PATENT DOCUMENTS

| | | | |
|---|---|---|---|
| 2,012,958 A | * 9/1935 | Colby et al. ............ 305/164 X |
| 2,061,223 A | * 11/1936 | Cunningham et al. ... 305/164 X |
| 2,647,023 A | * 7/1953 | Kubaugh ................ 305/59 X |
| 3,178,239 A | * 4/1965 | Zeller ................... 305/202 X |
| 3,282,630 A | * 11/1966 | Harrison et al. ........ 305/169 X |
| 3,545,821 A | 12/1970 | Erickson |
| 3,613,811 A | 10/1971 | Brandli |
| 3,637,265 A | 1/1972 | Valentine et al. |
| 3,658,392 A | 4/1972 | Perreault et al. |
| 3,722,961 A | 3/1973 | Haley et al. |
| 3,754,798 A | * 8/1973 | Chaumont ............. 305/168 X |
| 3,776,598 A | * 12/1973 | Nichols .................. 305/181 |
| 3,887,243 A | 6/1975 | Chaumont |
| 3,933,213 A | 1/1976 | Trowbridge |
| 4,023,865 A | 5/1977 | Morissette |
| 4,120,537 A | * 10/1978 | Roley et al. ........... 305/122 X |
| 4,191,431 A | * 3/1980 | Roley et al. ............ 305/127 |
| 4,194,583 A | 3/1980 | Aaen |
| 4,217,006 A | 8/1980 | Dehnert |
| 4,222,453 A | 9/1980 | Fixsen et al. |
| 4,474,414 A | 10/1984 | Tokue |
| 4,826,260 A | 5/1989 | Plourde |
| 4,987,965 A | 1/1991 | Bourret |
| 4,991,911 A | 2/1991 | Blais |
| 5,415,470 A | 5/1995 | Courtemanche |
| 5,511,869 A | * 4/1996 | Edwards et al. ........ 305/195 X |
| 5,755,495 A | * 5/1998 | Cook et al. ............. 305/122 |

FOREIGN PATENT DOCUMENTS

| | | | |
|---|---|---|---|
| DE | 1800353 | * 7/1969 | ................. 305/168 |
| JP | 2293282 | * 10/1990 | ................. 305/195 |
| JP | 4274976 | * 9/1992 | ................. 305/168 |

* cited by examiner

Primary Examiner—Russell D. Stormer
(74) Attorney, Agent, or Firm—Vidas, Arrett & Steinkraus P.A.

(57) ABSTRACT

A bearing for use with a snowmobile track is disclosed. The bearing includes an axle surrounded by a sleeve which is free to rotate when the snowmobile track is driven by the machine. The rails of the suspension systems of the snowmobile ride on the rolling surface resulting in reduced friction. The bearing can be used in a clip on the track or can be included in the track itself. A lubricious coating is utilized to reduce friction between the axle and the sleeve or bushing rotating about the axle.

8 Claims, 7 Drawing Sheets

BEARING FOR SNOWMOBILE TRACK

CROSS REFERENCE TO RELATED APPLICATION

This application is a continuation in part application of U.S. Ser. No. 08/710,179 filed Sep. 13, 1996 now U.S. Pat. No. 5,755,495, entitled Bearing For Snowmobile Track which is hereby incorporated by reference.

FIELD OF THE INVENTION

This invention relates to a bearing for use in a snowmobile track and more particularly, to a bearing having a bearing surface which rotates and a snowmobile track which utilizes the bearing. This invention also has particular relevance to a bearing rotating about a pin where a coating is utilized for improved performance.

BACKGROUND OF THE INVENTION

Currently, most snowmobiles utilize a slide rail suspension system having two main rails which ride on a continuous track. In this type of suspension, the track includes two outer portions and one central portion where the portions are connected by connector rods spaced a predetermined distance from each other forming two parallel rows of windows or sprocket holes along the continuous direction of the track. Clips having a generally rectangular bearing surface are clipped to the connector rods. Driving power for the track is provided by a pair of driven sprockets which engage the track to turn it. The rails of the suspension system ride on the bearing surface of the clips as the track rotates.

There is a tremendous amount of friction between the slide rails and the bearing surface of the clips. The greater the friction, the greater the wear on the parts and the slower the snowmobile. Also, the friction results in high temperatures which cause damage to the rails, the clips, or both. Under certain conditions rails may melt to the track at these points, instantly locking up the machine. This problem occurs in icy conditions or when riding trails where deep snow is not available to cool the rails. In order to reduce the friction, many different materials have been used, but with minimal success. Also, a number of wheels sometimes called helper wheels have been utilized in suspension systems to hold the rails off the bearing surfaces slightly to reduce the wear on the rails. However, the use of these wheels introduces drag which slows the machine. Further, when helper wheels are used suspension efficiency is decreased and the wheels are a maintenance burden because they often require maintenance and/or replacement.

Therefore, it is desirable to have a snowmobile track with a bearing surface for slide rails with reduced friction between the rails and the bearing surface.

SUMMARY OF THE INVENTION

The invention is an improved bearing which results in an improved snowmobile track. The inventive track is an endless snowmobile track of the type used with a machine having a slide rail suspension. The track is driven by a system using sprocket wheels which engage the track and where the slide rails ride on the improved bearing.

A bearing for use with a track of a snowmobile is disclosed. The track is of the type having at least two track sections and the snowmobile having a suspension system including at least one slide rail for contacting the bearing where the bearing comprises: support means connected between the track sections; and a rolling means operatively connected to the support means, the rolling means being freely rotatable.

A track for use with a snowmobile having a suspension system including at least one slide rail for riding on a bearing surface of the track is also disclosed. The track comprises a first track portion and a second track portion, the track portions spaced a predetermined distance apart forming a gap; a plurality of securing means for securing the first track portion to the second track portion, the securing means being arranged generally to span the gap formed between the first and second portions and spaced a predetermined distance apart; and a bearing means operatively connected to each securing means, the bearing means comprising a roller for contact with the slide rail of the snowmobile.

The track may include securing means which comprises: a first member, the first member including a horizontal plate and a vertical plate, the plates connected and positioned such that the horizontal plate is generally perpendicular to the vertical plate; a second member, the second member including a horizontal plate and a vertical plate, the plates connected and positioned such that the horizontal plate is generally perpendicular to the vertical plate; a fastening means connected to the horizontal plate of each of the first and second members and the first and second track portions; and an axle connected between the vertical plates of the first and second members.

A clip for a snowmobile track is disclosed. The clip comprises a connector, the connector comprising a generally rectangular base having two sides and two ends, a pair of opposed downwardly facing fastening means connected to each side of the base, and a pair of opposed upwardly facing supporting means connected to each end of the base; a pin connected between the pair of upwardly facing supporting means; a sleeve surrounding the pin, the sleeve being freely rotatable about the pin, the sleeve having first and second ends; and a pair of washers surrounding the pin, the first washer located between the first end of the sleeve and the corresponding upwardly facing supporting means, the second washer located between the second end of the sleeve and the corresponding upwardly facing supporting means.

One object of the invention is to provide a bearing surface where friction is greatly reduced between the rail and the bearing surface. The bearing includes an axle and a sleeve which is rotatable about the axle. In this manner, the slide rail of the suspension system rides across the rotating sleeve. The sleeve rotates due to the movement of the track. This rolling bearing surface results in much less friction than typical tracks.

Another object of the invention is to reduce the friction between the axle and the sleeve which is rotatable about the axle. The axle is coated with a lubricious coating thereby reducing the friction between the rotating sleeve and the axle of the bearing. In this manner, the track performs better because the rolling bearing surface may rotate even more freely. The coating is of the type that is long lasting. The coated pin adds to the life of the bearings. Wear is reduced and therefore, the cost related to replacement of bearings or a track is also reduced. Overall, the coated axle results in a better performing track by further reducing friction. It is also contemplated that the inner surface of the sleeve may be coated to provide the same effect. The inner surface of the sleeve and the outer surface of the axle may also be coated if desired.

Another object of the invention is to provide a track clip for a snowmobile track with an improved bearing surface. The clip is mounted in a track of the type having windows where rails of the suspension system ride on the clips. The clip includes opposed downwardly facing flanges which are connected to the track and further includes two support members for mounting an axle and sleeve arrangement to form the bearing for the rail of the suspension system. The coated axle may also be used with the clip arrangement. The roller inner surface could also be coated in addition to or instead of the coated axle.

Yet another object of the invention is to provide a bearing for use in a snowmobile track which includes a guide for guiding the movement of the track relative to the slide rails.

Still another object of the invention is to provide a track with an improved bearing for use with a snowmobile with a suspension utilizing slide rails where the helper wheels are eliminated.

In this manner, a reduced friction bearing surface is utilized resulting in reduction of both wear and costly replacement of parts and a faster ride for the user. The roller results in an improved inventive track which may be used with current suspension systems. Further, the invention provides a means for adapting current tracks which utilize clips to include an improved clip thereby allowing the benefits of the reduced friction to be taken advantage of by many users.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
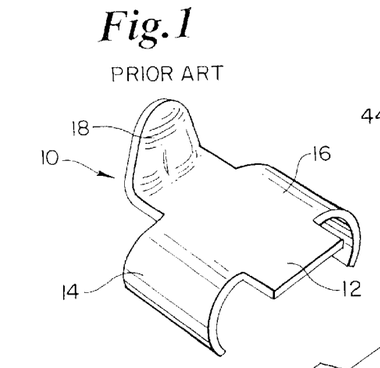
FIG. 1 is a perspective view of a prior art clip for a snowmobile track.

FIG. 1 shows a typical prior art clip 10 formed with a generally rectangular bearing portion 12. The prior art clip 10 includes two mounting members 14 and 16 connected to opposite longer sides of the generally rectangular portion 12. The prior art clip 10 also includes a guide 18 connected to one short side of the generally rectangular portion 12. The guide 18 helps maintain alignment of the track 20 when the snowmobile is operating. Typically, these clips 10 are made of steel and may be coated with zinc. The prior clips 10 are designed to be used with a continuous or endless track for a snowmobile utilizing a slide rail suspension. A typical slide rail suspension is shown in U.S. Pat. No. 4,987,965 to Bourret and is hereby incorporated by reference. The slide rail suspension includes spaced longitudinal rails which slide on the ground engaging track. The suspension typically includes two sprockets having teeth which engage lugs on the inner side of the track (involute drive system) or engage apertures or windows in the track (convolute drive system) to drive the track. The rails slide on the bearing portion 12 of the clip 10.

Figures 3, 4:
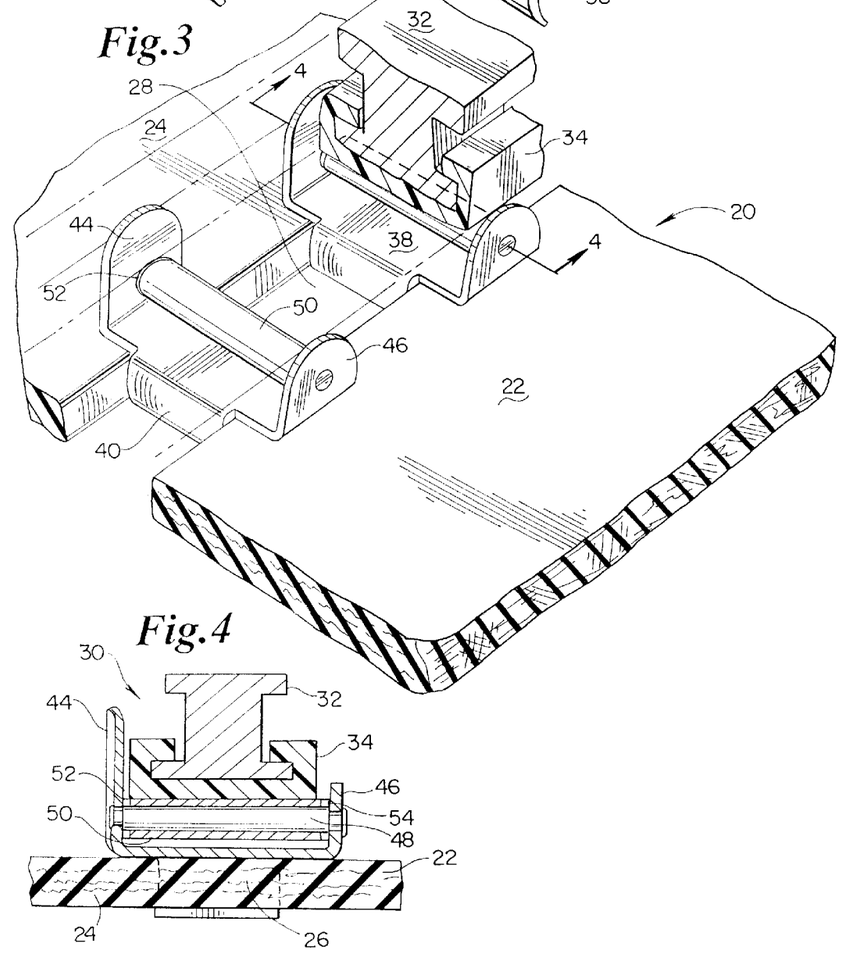
FIG. 3 is a perspective partial view of a snowmobile track and a slide rail utilizing a clip in accordance with the invention.
FIG. 4 is a cross-sectional view of the clip in the track with the rail on the bearing surface taken along the line 4—4 of FIG. 3.

Referring to FIG. 3, a typical track and slide rail will be described. A typical track belt 20 for a snowmobile includes a continuous central belt portion 22 and two continuous outer belt portions 24 (only one of which is shown) spaced longitudinally a predetermined distance apart in a generally parallel fashion. The belt sections are of the same length and generally the width of the central portion 22 is greater than the width of each of the outer portions 24. The portions 22 and 24 are generally integrally connected by connectors 26 and the connections are increased in strength by the use of reinforcing rods embedded in the track. A typical integral track with integral sections and reinforcing rods is shown in U.S. Pat. No. 4,217,006 to Dehnert which is hereby incorporated by reference. Tracks may be made of reinforced rubber or of an appropriate plastic and are typically molded. The formation of a track 20 as described above creates a plurality of windows or apertures 28.

Therefore, with a typical suspension utilizing drive sprockets having teeth, the teeth engage the windows 28 of the track 20 and drive the track. This type of drive system is referred to as a convolute drive system and is described in U.S. Pat. No. 3,887,243 to Chaumont which is hereby incorporated by reference. It should be understood that the invention may be utilized with a machine which uses an involute drive system and appropriate track. Such a system is described in U.S. Pat. No. 4,217,006 to Dehnert. In an involute drive system, drive sprockets include driving teeth which engage driving lugs or projections appropriately spaced and arranged on the inner surface of the track sections and drive the track.

In the case of either track or drive system described above, a pair of slide rails (only one of which is shown) are configured and arranged as part of the suspension system of the machine to meet the track where the connectors 26 and windows 28 are formed. Slide rails 30 include a support 32 and a slide member 34 connected thereto. The support 32 is typically made of metal such as steel or aluminum and connected to the suspension system by known means. The slide member 34 typically is made of a low friction material such as TEFLON or polytetraflouroethylene or ultra high molecular weight plastic (UHMW).

The prior art clips 10 are connected to the track 20 for use (not shown). The mounting members 14 and 16 surround the connectors 26 and are cinched into place. The slide rails 30 come into contact with and ride on the bearing surface 12 of the clip 10. The contact of the rail member 34 with the clip 10 causes great friction which generates heat and causes excessive wear and failure. Therefore, an improved clip 36 is disclosed. The improved clip 36, when used in a typical track 20, generates much less friction leading to less wear and failure of slider rails and clips than prior clips.

Figure 2:
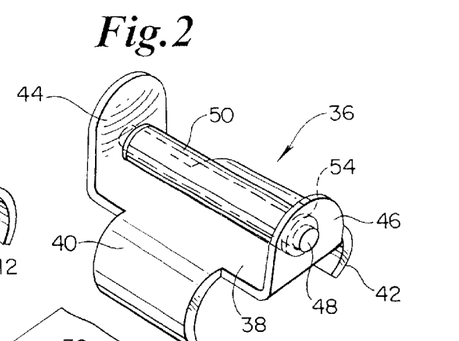
FIG. 2 is a perspective view of a clip in accordance with the invention.

Referring now to FIG. 2, an improved clip 36 is shown. The clip 36 includes a base 38. The base 38 is generally rectangular having two long and two short sides. A pair of opposed downwardly facing fasteners 40 and 42 are connected to each of the long sides of the base 38. The fastening portions 40 and 42 are integral with the base 38 in this embodiment. However, it should be known that the portions may not be integral but connected by typical means known to those skilled in the art. The fastening portions 40 and 42 are arranged and configured to mate with the connector portions 26 of the track 20 by typical means. The fastening portions 40 and 42 are generally c-shaped in cross section in the preferred embodiment although it should be understood that any appropriate shape may be utilized.

The clip 36 further includes support means or members 44 and 46. The support members 44 and 46 are connected on each of the short sides of the base 38 and are integral with the base in this embodiment. A pin or axle 48 is supported between the support members 44 and 46. The connection is made by weld in this embodiment but any appropriate connection such as riveting or soldering, for example, may be utilized. A sleeve 50 surrounds the pin 48. The sleeve 50 is free to rotate about the axle 48. A pair of washers 52 and 54 are located on each end of the sleeve or roller 50. The washers or bushings 52 and 54 are made of TEFLON in this embodiment and work like bearings to reduce friction between the sleeve 50 and the supports 44 and 46 during operation. The washers 52 and 54 prevent wear which would occur if the roller 50 was allowed to engage the supports 44, 46. The support 44 extends further from the base 38 than the support 46 in this embodiment. This extra length serves as a guide for the slide rails of a suspension system. A guide 44 is used to ensure that the rails and track stay positioned with respect to one another. Guides 44 are used on both sides of the track and are positioned toward the outside of the track. It should be understood that both supports 44 and 46 may be of a length appropriate to act as guides. If desired, the supports 44, 46 could be of the same length and guide the rail on both sides.

In operation, the clips 36 are placed on a track 20 of the type described above and slide rails 30 are aligned to slide on the rollers 50 of each clip 36 as shown in FIGS. 3 and 4. The sprockets of the suspension system are driven by the transmission and powered by the motor of the machine and the teeth of the sprockets engage the apertures 28 (convolute) or lugs (involute) of the track 20 to drive the track 20. As the track is driven, the rails 30 slide over the moving clips 36. The rail member 34 rides on the roller 50 of the clips 36. The roller 50 rotates freely due to the advancement of the track and the contact with the rail member 34. The washers 52 and 54 help maintain constant free rolling of the sleeve. The pin 48 and sleeve 50 provide a bearing surface for the rails where the friction created is far less than those of the past. The support 44 guides the rails 30 so that the track 20 stays in the desired position.

The clips 36 may be utilized in a track which currently utilizes prior art clips. The old clips can be replaced. The suspension may only have to be modified by utilizing a rail which is not as thick as the current rails. This would compensate for the difference in height of the prior clip and the new inventive clips. In an involute drive system, the width of the sprocket may have to be narrowed so that there would be no interference between the clips and the sprockets. It should be understood that the current suspension systems may have to modified slightly to accommodate the use of the invention but that any such modifications would be routine engineering.

Figure 5:
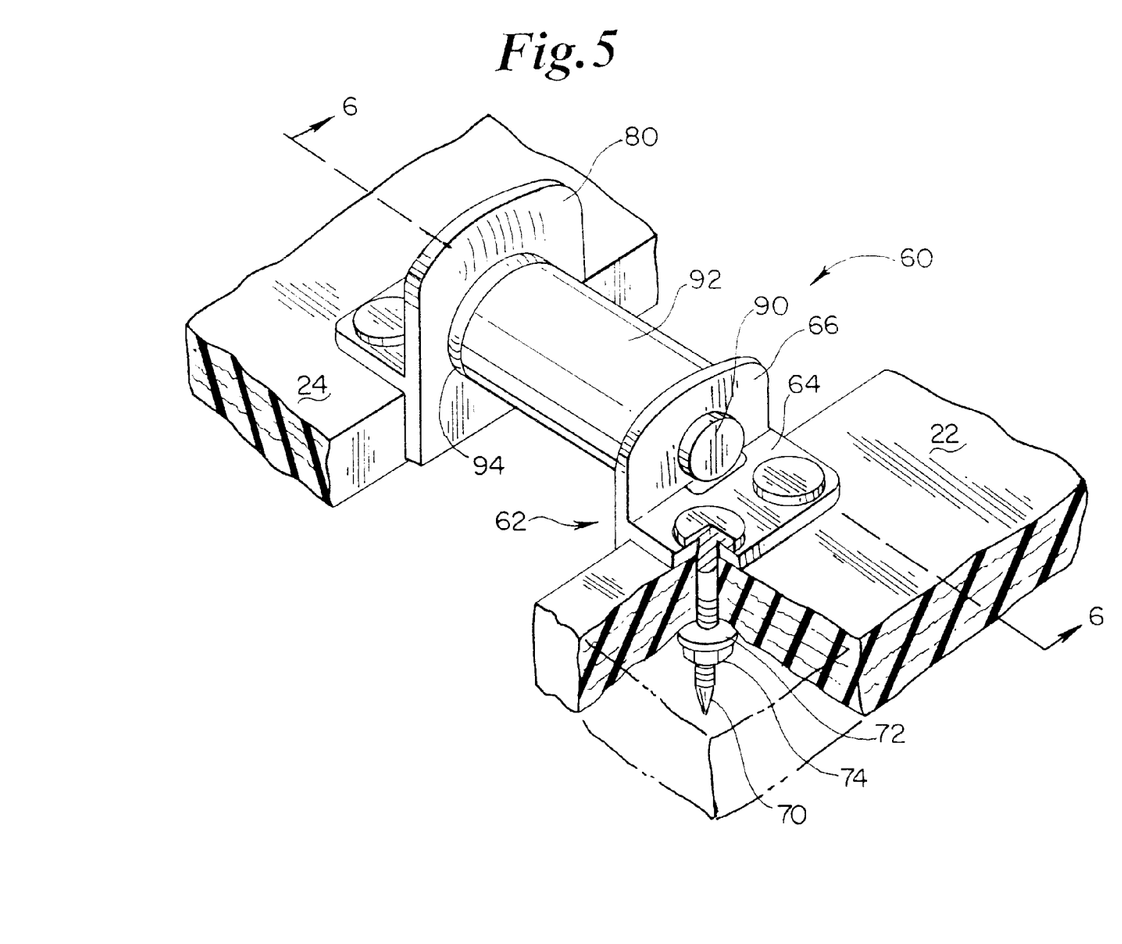
FIG. 5 is a perspective view of another embodiment of a bearing in accordance with the invention.
Figure 6:
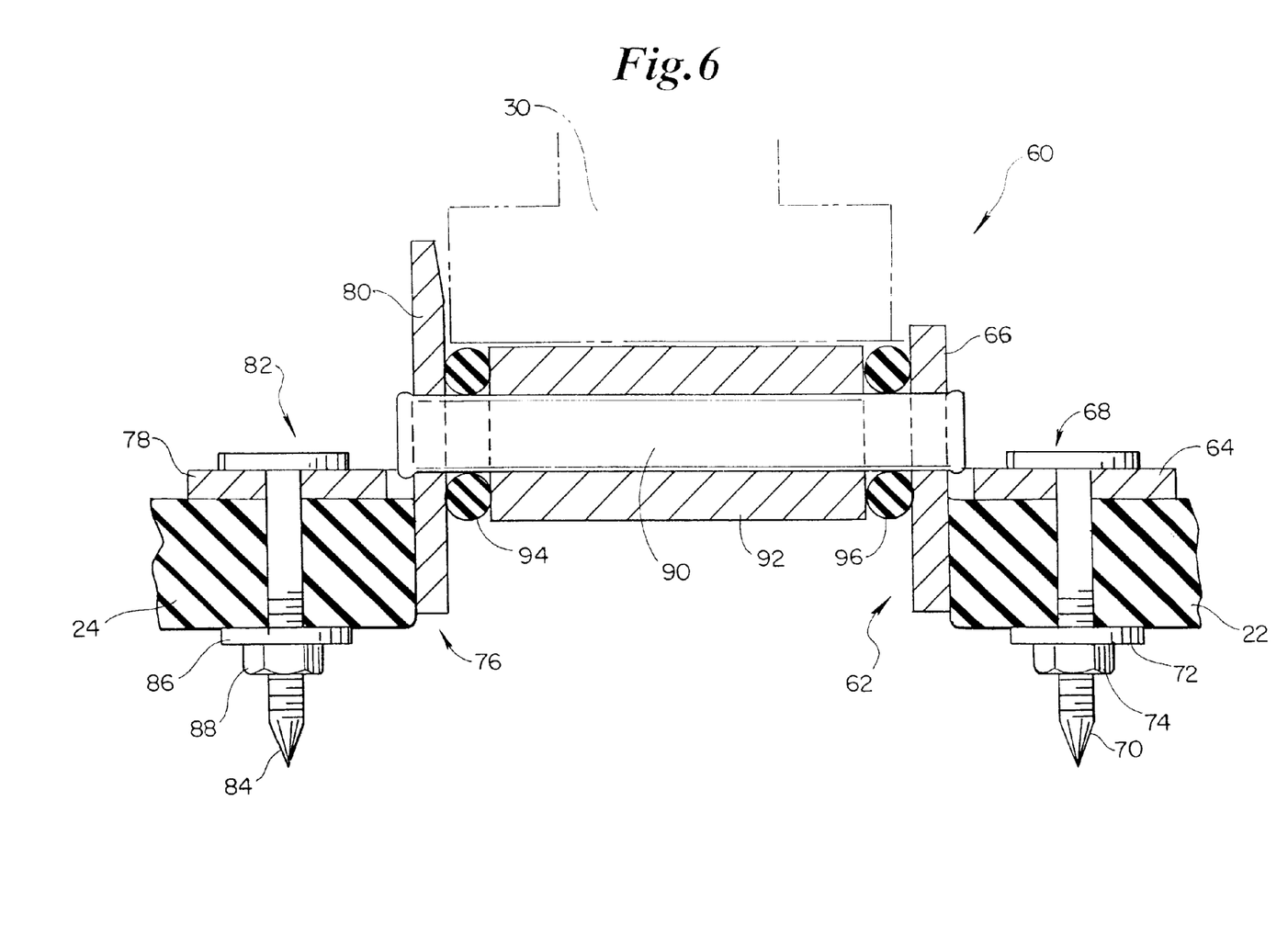
FIG. 6 is a cross sectional view of a bearing in accordance with the invention taken along the line 6—6 of FIG. 5.

Referring now to FIGS. 5 and 6, the preferred embodiment of the invention is shown. In this embodiment the clip portion is eliminated and the improved bearing assembly 60 is built into the track. The track 20 includes an inner portion 22 and two identical outer portions 24 (only one of which is shown) and is driven as described above. The bearing assembly 60 connects the inner and outer portions of the track 22 and 24. A first track connector 62 is connected to the inner portion of the track 22. In this preferred embodiment, the first track connector 62 includes a first plate 64 which is generally horizontal and a second plate 66 which is generally vertical. A pair of fasteners 68 connect the first track connector 62 at first plate 64. In the preferred embodiment, the fastener 68 includes stud 70 made of metal such as carborundum, carbide or hardened steel and a washer 72 and nut 74 arrangement. The studs 70 are of a length which allows contact with the ground for added traction in the preferred embodiment although it should be recognized that the invention contemplates use of studs or rivets which need not engage the ground. Any suitable fastening means known to those skilled in the art may be utilized.

A second track connector 76 is connected to the outer portion of the track 24. In this preferred embodiment, the second track connector 76 includes a first plate 78 which is generally horizontal and a second plate 80 which is generally vertical. A pair of fasteners 82 connect the second track connector 76 at first plate 78. In the preferred embodiment, the fasteners 82 include a stud 84 like stud 70 and a washer 86 and nut 88 arrangement. The first and second track connectors 62 and 76 are generally t-shaped in cross-section and are made of steel in the preferred embodiment. Any other appropriate materials or shapes may be utilized within the spirit of the invention.

An axle 90 is supported between the plate 66 of the first connector 62 and the plate 80 of the second connector 76. In this manner, the inner and outer portions 22 and 24 of the track 20 are connected for use. The axle 90 is connected by weld in the preferred embodiment although other means such as a rivet may be used. A sleeve or roller 92 operatively surrounds the axle 90. The sleeve 92 is free to rotate about the axle 90. A pair of washers or bushings 94 and 96 are located on either end of the roller 90. The bushings 94 and 96 are made of TEFLON in the preferred embodiment and allow the sleeve 90 to rotate without generating excessive friction between the sleeve 92 and the plates 66 and 80. The bushings 94 and 96 may be made of other suitable materials including stainless steel.

Figure 11:
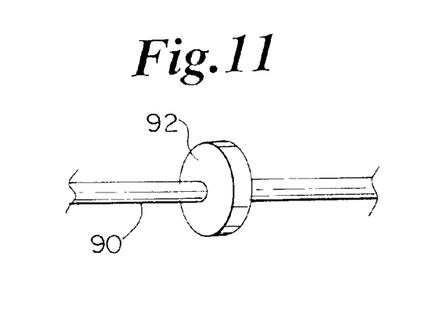
FIG. 11 is a perspective view of another embodiment of a bearing in accordance with the invention.
Figure 12:
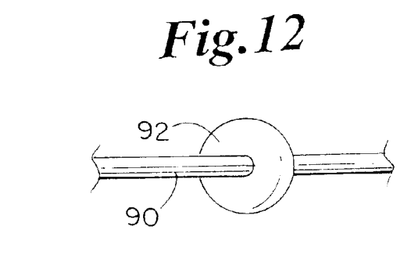
FIG. 12 is a perspective view of another embodiment of a bearing in accordance with the invention.

It should be recognized that the roller 92 may be of a different shape, if desired. For example, rather than generally cylindrical the roller may be of a wheel shape (see FIG. 11) or may be of a spherical or ball shape (see FIG. 12). These embodiments would be connected to an appropriate axle for free rotation.

The bearing assembly 60 operates with the track and rails as described above. The rails 30 ride on the surface of roller 92 which is operatively connected to the track 20. The roller 92 rotates freely to provide a reduced friction arrangement. In this preferred embodiment the studs 70 and 84 engage the ground to provide additional traction to that of the rest of the track 20. Also, in any of the embodiments described herein, in the event foreign matter such as a rock or dirt is introduced which locks up a sleeve so it is no longer rolling, the rails 34 ride on the sleeve 92 as a stationary bearing surface. Further, the assembly 60 or clip 36 can then be easily replaced, if desired.

Figure 7:
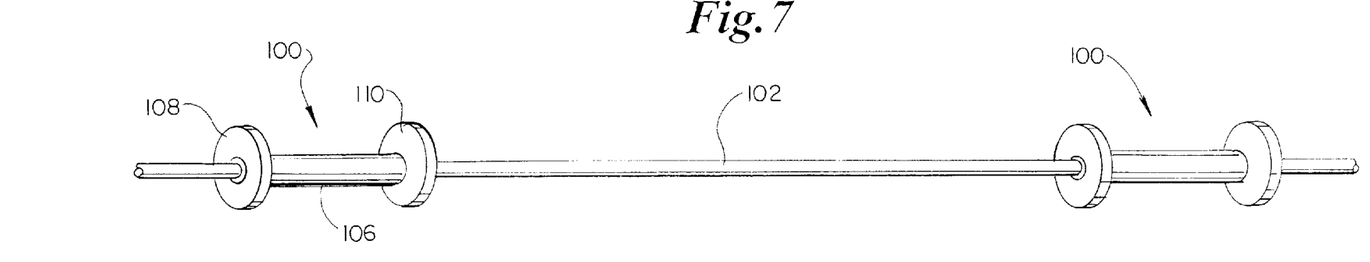
FIG. 7 is a perspective view of another embodiment of a bearing in accordance with the invention.
Figure 8:
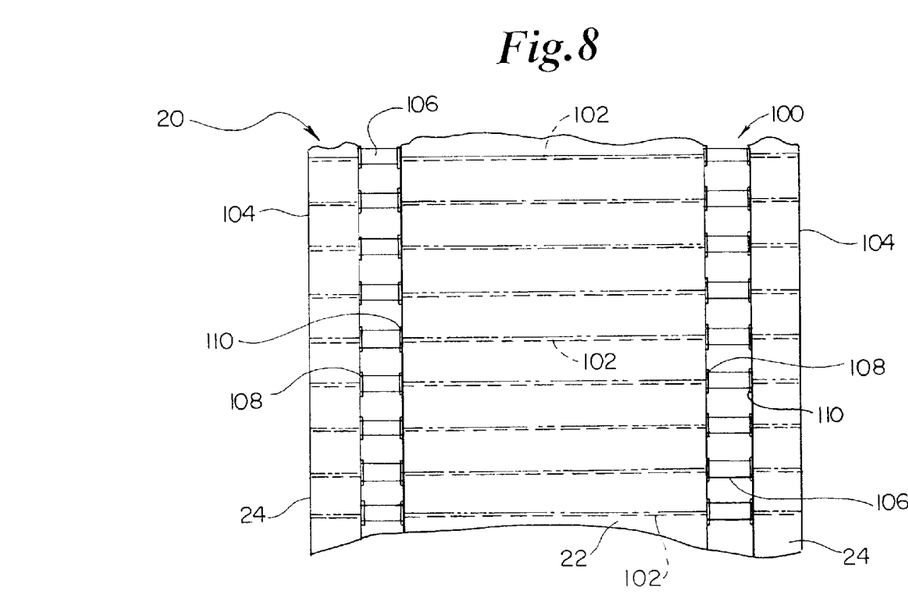
FIG. 8 is a top elevational view of portion of an inventive track.

Referring now to FIGS. 7 and 8, yet another embodiment of the invention is shown. A bearing assembly 100 is molded within the track 20. The track 20 is shown in FIG. 8 and includes an inner track portion or belt 22 and two outer track portions or belts 24. Rods 102 are molded into the track portions 22 and 24 and connect the belts. In this embodiment, the track rods 102 extend the full width of the track from the outer edge 104 of track portion 22 through track portion 24 and continue through track portion 22 to the outer edge 104. The rods 102 ensure a strong interconnection of the belts 22 and 24. However, the rods 102 may be of varying lengths as desired. The bearing assembly 100 includes a roller 106 which is configured and sized to freely rotate about the track rod 102. A pair of washers 108 and 110 are positioned on either side of the roller 106. The washers 108 and 110 are utilized to prevent the rollers 106 from contacting the rubber track sections and also may be used as guides for the slide rails.

The track shown in FIG. 8 is integrally formed in the preferred embodiment. The track is generally molded by known means as one piece using rubber and may include composite or glass fibers. The plurality of rods 102 are positioned as desired in the track sections 22 and 24 and the bearing assemblies 100 are positioned on the rods 102 between the sections 22 and 24 to allow for free rotation of the rollers 106 with the washers 108 and 110 positioned between the section 24 and roller 106 and between roller 106 and section 22 as shown in FIG. 8. In this manner, a track 20 is formed with a plurality of rods supporting the plurality of bearings molded as a unitary track. In the preferred embodiment, the rods 106 are made of steel although other appropriate materials may be used and the washers 108 and 110 are made of stainless steel or TEFLON although other suitable materials may be utilized. This embodiment provides a bearing and track which further reduces friction between the rail of the suspension and the track. The rollers contact the ground and this contact with the snow provides a cooling and lubrication to the bearing.

Figure 9:
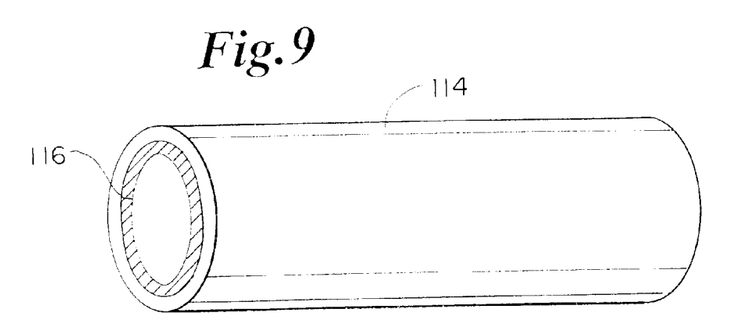
FIG. 9 is a perspective view of another embodiment of a bearing in accordance with the invention.
Figure 10:
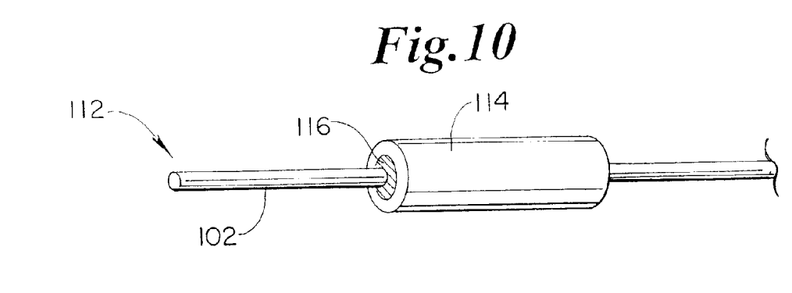
FIG. 10 is a perspective view of the inventive embodiment of FIG. 9 with a connector rod of a track.

Referring now to FIGS. 9 and 10, another embodiment of the invention is shown. This embodiment is utilized in a similar fashion to that described in FIGS. 7 and 8 but the bearing assembly 112 includes an outer roller 114 and an inner bushing 116. The inner bushing 116 is configured to freely rotate about rod 102 and is configured to fit within the outer roller 114. Therefore, the inner bushing 116 and outer roller 114 arrangement rotate about the rod 102. In this embodiment, the bushing 116 is made of plastic, TEFLON, fiber glass or brass although other suitable materials may be utilized. The outer roller 114 is made of steel, preferably stainless steel but other suitable materials may be used. The inner bushing 116 prevents contact between the steel roller 114 and the steel rod 102. The elimination of the steel to steel contact further reduces friction. The assembly 112 is formed in a track as is shown in FIG. 8 and described above and the washers 110 and 112 may be utilized.

Therefore, in operation, the track 20 as contemplated in FIGS. 8–12 is used with a snowmobile where the track is driven by appropriate means and the slide rails of the suspension system ride on the bearing assemblies 100 or 112. The washers 108, 110 act as guides. The washers may be of different sizes to provide for one or two guides for a rail. The rollers rotate as the track is driven resulting in a reduction in friction between the rails and the bearing surface.

It should also be understood that the inner bushing 116 may be utilized in any of the previously described embodiments with any of the rollers to further reduce friction. The rollers in these embodiments would be adapted and configured to include the bushing 116.

Figure 13:
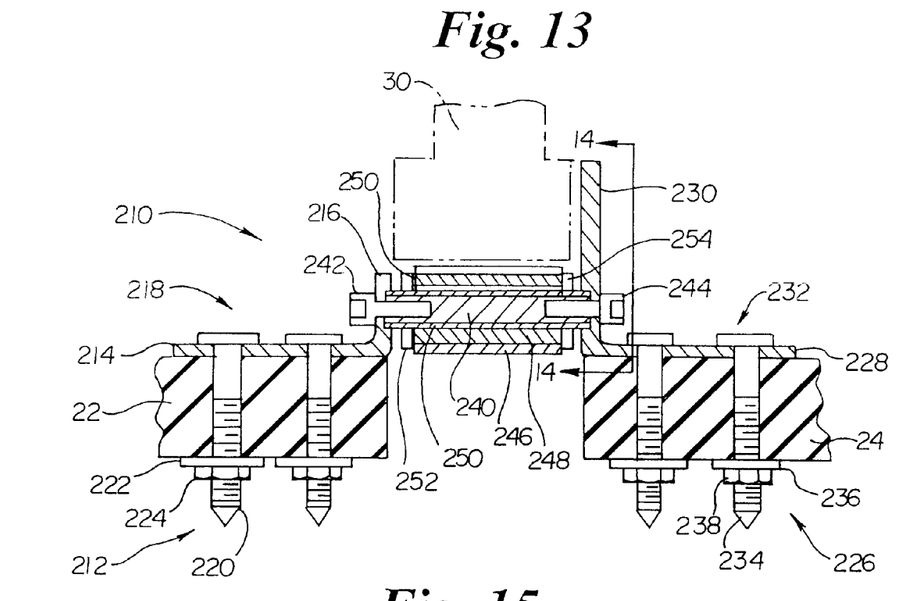
FIG. 13 is a cross sectional view of a bearing in accordance with the invention utilizing a coating.
Figure 14:
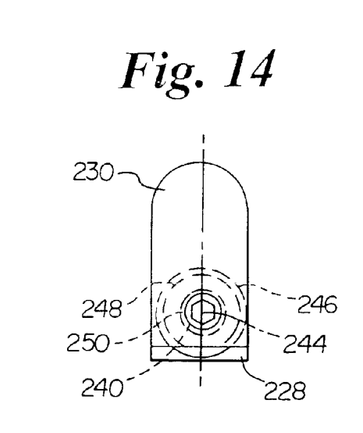
FIG. 14 is an end view of the bearing taken along the line 14—14 of FIG. 13 shown without attachment to the track.
Figure 15:
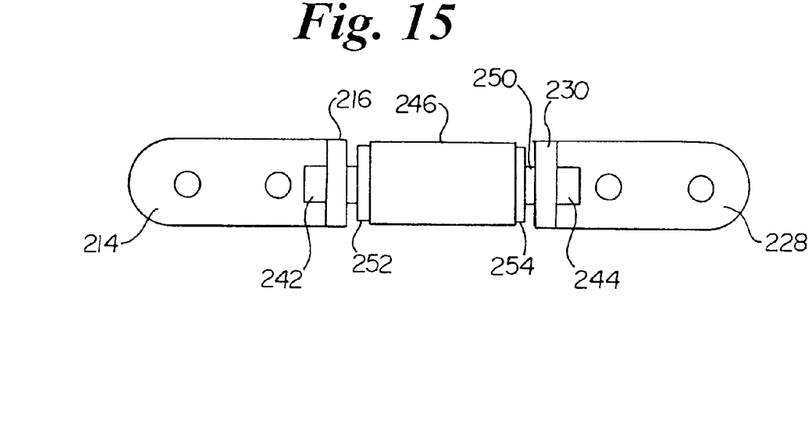
FIG. 15 is top plan view of the bearing in accordance with the invention of FIG. 13 shown without attachment to the track.

Referring now to FIGS. 13–15, another preferred embodiment of the invention is shown. In this embodiment the clip portion is eliminated and the improved bearing assembly 210 is built into the track. In this embodiment, the bearing is used in a track like that described in relation to FIGS. 5 and 6 above where the track 20 includes an inner portion 22 and two identical outer portions 24 and is driven as described above. The bearing assembly 210 connects the inner and outer portions of the track 22 and 24. A first track connector 212 is connected to the inner portion of the track 22. In this preferred embodiment, the first track connector 212 includes a first plate 214 which is generally horizontal and a second plate 216 which is generally vertical. A pair of fasteners 218 connect the first track connector 212 at first plate 214. In the preferred embodiment, the fastener 218 includes stud 220 made of metal such as carborundum, carbide or hardened steel and a washer 222 and nut 224 arrangement. The studs 220 are of a length which allows contact with the ground for added traction in the preferred embodiment although it should be recognized that the invention contemplates use of studs or rivets which need not engage the ground. Any suitable fastening means known to those skilled in the art may be utilized.

A second track connector 226 is connected to the outer portion of the track 24. In this preferred embodiment, the second track connector 226 includes a first plate 228 which is generally horizontal and a second plate 230 which is generally vertical. A pair of fasteners 232 connect the second track connector 226 at first plate 228. In the preferred embodiment, the fasteners 232 include a stud 234 like stud 220 and a washer 236 and nut 238 arrangement. The first and second track connectors 212 and 226 are generally L-shaped in cross-section and are made of steel in the preferred embodiment. Any other appropriate materials or shapes may be utilized within the spirit of the invention.

The bearing assembly 210 may also be molded into the track. The plates 214 and 228 are molded into the track material when the track is constructed. In this case, the plates 214 and 228 may be of any appropriate length as desired for molding into the track. The fasteners 218 and 232 would not be used if the assembly was molded into the track.

An axle or pin 240 is supported between the plate 216 of the first connector 212 and the plate 230 of the second connector 226. In this manner, the inner and outer portions 22 and 24 of the track 20 are connected for use. The axle 240 is connected by screws 242 and 244 in the preferred embodiment although other fastening means such as a rivet or welding, for example, may be used. A roller 246 operatively surrounds the axle 240 and is free to rotate about the axle. An inner bushing 248 is sized and configured to fit within the outer roller 246 and operatively surrounds the axle 240. The inner bushing 248 freely rotates about the pin 240. Therefore, the inner bushing 248 and outer roller 246 arrangement rotate about rod 240.

A coating 250 is utilized in this embodiment to further reduce friction between the rotating parts. The pin 240 is coated on the outside surface with a lubricious coating 250. A number of different coatings and appropriate methods for applying the coatings may be utilized with the invention. For example, a ceramic may be plasma coated onto the pin 240. In a preferred embodiment, the ceramic has a hardness 55–60 RC with a 16 micromash finish and is supplied by Twin City Flame Spraying Inc. of Minn. It should be understood that any appropriate ceramic may be applied to the pin to provide a lubricious surface. Other coatings which may be used are polytetrafluoroethylene (TEFLON) which is generally sprayed on or fusion coated; urethane which is generally sprayed on or the part is dipped; boron which is heat treated and generally spray applied; a nickel-chrome alloy which can generally be sprayed or dipped; ceramic-Teflon mix which is known as Duraslide and is supplied and applied by Precision Coatings Inc. of St. Paul, Minn.; or tungsten carbide which is generally plasma coated. Of course, it should be understood that any lubricious coating or coatings may be used alone or in combination and that any appropriate method of application can also be used as is known to those skilled in the art.

The pin or axle 240 is constructed of steel in the preferred embodiment. Other possible materials for the pin are: stainless steel, high carbon steel, aluminum, titanium, inconel, monel, bronze, magnesium, or tungsten. Of course any other appropriate material can be used with the invention. The inner bushing 248 is made of a lubricated blended steel in the preferred embodiment. The bushing is self lubricating in that as heat builds up a lubrication releases from the pores of the steel. This self lubricating material can be purchased from Drives Incorporated of Moline, Ill. Other appropriate materials may be utilized including but not limited to steel, stainless steel, high carbon steel, for example. The outer roller 246 is made of steel in the preferred embodiment. It should be understood that other materials such as stainless steel, high carbon steel, titanium, for example and other appropriate materials can also be utilized with the invention. A coating (not shown) to prevent rust can also be used on this roller. In the preferred embodiment, the materials for the outer roller 246 and the inner bushing 248 are not the same material. However, it is contemplated that the same material may be used and that a lubricious coating could also be used on the inner surface of the roller 246 and/or the outer surface of the inner bushing 248. It is also contemplated that the inner bushing may not be used and that the outer roller 246 would be used with the axle 240. In this case, the outer surface of the axle 240 would utilize a coating 250.

A pair of washers or bushings 252 and 254 are located on either end of the roller 246. The bushings 250 and 252 are made of TEFLON in the preferred embodiment and allow the sleeve 246 and inner roller 248 to rotate without generating excessive friction between the sleeve 246 and roller 248 and the plates 216 and 230. The bushings or washers 252 and 254 may be made of other suitable materials including stainless steel.

Figure 16:
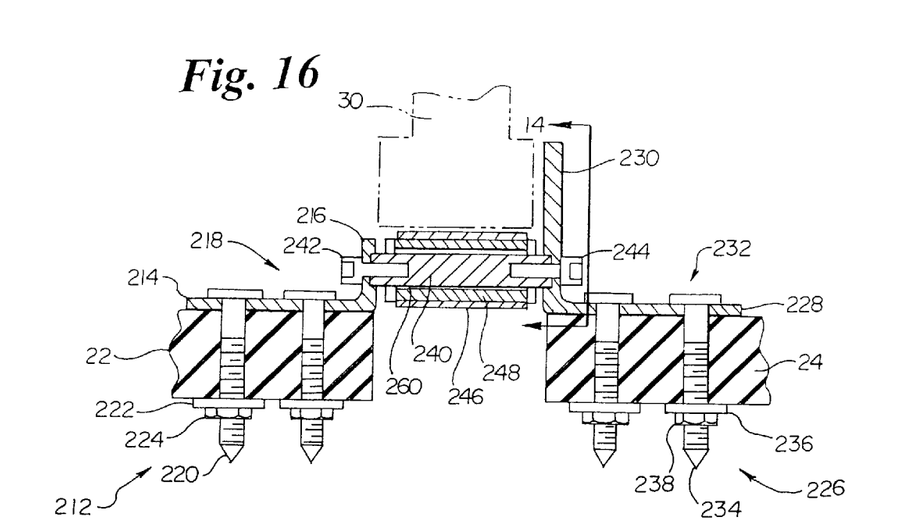
FIG. 16 is a cross sectional view of a bearing in accordance with the invention utilizing a coating.

Referring now to FIG. 16, another embodiment of the invention is shown. This embodiment is the same as that of FIGS. 13–15 but instead of having a coating 250 on the outer surface of the axle 240 a coating is applied to the inner surface of the inner bushing 248. The coating 260 is of the type described above and is applied in the appropriate manner. Although the pin 240 is not shown as coated in FIG. 16 it is contemplated that both the inner surface of bushing 248 and the outer surface of the axle 240 may be coated in another embodiment.

It is also contemplated that the inner bushing may not always be utilized and that it is possible to coat the inner surface of the outer roller 246 and/or the axle 240. It should also be understood that any of the configurations described herein may utilize a lubricious coating on the axle and/or the inner surface of the bushing or inner surface of the outer roller.

It should be recognized that the roller 246 may be of a different shape, if desired. For example, rather than generally cylindrical the roller may be of a wheel shape (see FIG. 11) or may be of a spherical or ball shape (see FIG. 12). These embodiments would be connected to an appropriate axle for free rotation and may be used with or without an inner bushing.

The bearing assembly 210 operates with the track and rails as described above. The rails 30 ride on the surface of roller 246 which is operatively connected to the track 20. The roller 246 rotates freely to provide a reduced friction arrangement. In this preferred embodiment the studs 220 and 234 engage the ground to provide additional traction to that of the rest of the track 20. Also, in any of the embodiments described herein, in the event foreign matter such as a rock or dirt is introduced which locks up a sleeve so it is no longer rolling, the rails 34 ride on the sleeve 246 as a stationary bearing surface. Further, the assembly 210 or clip 36 can then be easily replaced, if desired.

Figure 17:
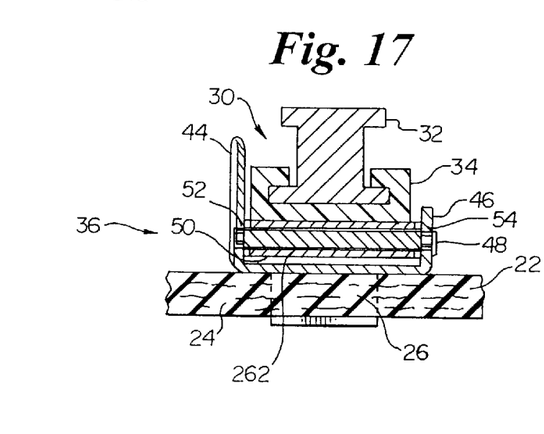
FIG. 17 is a cross sectional view of a clip utilizing a coating showing the clip on the track with the rail on the bearing surface.
Figure 18:
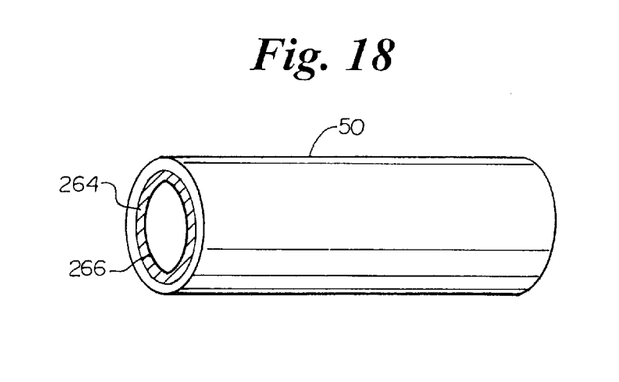
FIG. 18 is a perspective view of another embodiment of a bearing in accordance with the invention utilizing a coating.

Referring now to FIG. 17 an improved clip 36 is shown. The clip operates as previously described above but further includes a coating 262 which is applied to the axle 48. The coating is of the type described above in describing coating 250. In this manner, the roller 50 freely rotates about the axle 48 with reduced friction. It is also contemplated that an inner bushing may be used with sleeve 50. Another embodiment is shown in FIG. 18 where an inner bushing 264 is sized and configured to fit within the sleeve 50. A coating 266 is utilized on the inner surface of the inner bushing 264. This sleeve 50, bushing 264, and coating 266 combination may be utilized in the clip of FIG. 17 with or without the coating 262. The coating 266 is of the type previously described.

For ease of understanding, the invention was described for use in a track having an inner and two outer sections and utilizing two rails. It should be understood that any desired number of sections and rails may be utilized. The track may be integral or be made up of separate connected sections. It is also contemplated that the track may be of the type that does not include windows or apertures. In this track, the assembly 60 would be mounted on the track for use. An L-shaped connector may be used to connect the bearing to the track. Further, any desired number of assemblies or clips may be utilized. The track may include various means for additional traction such as steel cleats, steel picks or rubber molded paddles or other means known to those skilled in the art.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A track for use with a snowmobile having a suspension system including at least one slide rail for riding on a bearing surface of the track, the track comprising:

(a) a first track portion and a second track portion, the track portions spaced a predetermined distance apart forming a gap;

(b) a plurality of securing means for securing the first track portion to the second track portion, the securing means being arranged generally to span the gap formed between the first and second portions, the securing means spaced a predetermined distance apart, the securing means comprising an axle, the axle having a lubricious coating; and (c) bearing means operatively connected to each axle of the securing means, the bearing means comprising a roller for contact with the slide rail of the snowmobile;

wherein the securing means further comprises:

(d) a first member, the first member including a horizontal plate and a vertical plate, the plates connected and positioned such that the horizontal plate is generally perpendicular to the vertical plate;

(e) a second member, the second member including a horizontal plate and a vertical plate, the plates connected and positioned such that the horizontal plate is generally perpendicular to the vertical plate; and (f) fastening means connected to the horizontal plate of each of the first and second members and the first and second track portions;

whereby the axle is connected between the vertical plates of the first and second members.

2. The bearing of claim 1 herein the coating is ceramic.

3. The bearing of claim 1 wherein the coating is polytetrafluoroethylene.

4. The bearing of claim 1 wherein the coating is urethane.

5. The bearing of claim 1 wherein the coating is boron.

6. The bearing of claim 1 wherein the coating is nickel-chrome.

7. The bearing of claim 1 wherein the coating is tungsten carbide.

8. The bearing of claim 1 wherein the coating is ceramic-Teflon.

* * * * *